(12) United States Patent
Sun

(10) Patent No.: US 10,924,010 B2
(45) Date of Patent: Feb. 16, 2021

(54) CONTROL CIRCUIT AND CONTROL METHOD FOR SWITCHING REGULATOR AND SWITCHING REGULATOR WITH THE SAME

(71) Applicant: Silergy Semiconductor Technology (Hangzhou) LTD, Hangzhou (CN)

(72) Inventor: Liangwei Sun, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 171 days.

(21) Appl. No.: 16/114,394

(22) Filed: Aug. 28, 2018

(65) Prior Publication Data

US 2018/0367036 A1    Dec. 20, 2018

Related U.S. Application Data

(63) Continuation of application No. 15/582,881, filed on May 1, 2017, now Pat. No. 10,110,124.

(30) Foreign Application Priority Data

May 18, 2016 (CN) .......................... 201610334131.2

(51) Int. Cl.
*H02M 3/156* (2006.01)
*H02M 1/15* (2006.01)
*H02M 1/00* (2006.01)

(52) U.S. Cl.
CPC ......... *H02M 3/156* (2013.01); *H02M 3/1563* (2013.01); *H02M 1/15* (2013.01); *H02M 2001/0025* (2013.01)

(58) Field of Classification Search
CPC ............... H02M 3/156; H02M 3/1563; H02M 2001/0025; H02M 1/15
USPC .......................................... 323/271
See application file for complete search history.

(56) References Cited

U.S. PATENT DOCUMENTS

| 5,481,178 A | 1/1996 | Wilcox et al. |
| 6,456,050 B1 | 9/2002 | Agiman |
| 6,987,380 B1 * | 1/2006 | Lee ........................ H02M 3/156 323/285 |
| 7,049,800 B2 * | 5/2006 | Huang .................. H02M 3/156 323/271 |
| 7,482,791 B2 | 1/2009 | Stoichita et al. |

(Continued)

OTHER PUBLICATIONS

Received STIC search report from EIC 2800 searcher Samir Patel on dated Jan. 22, 2019. (Year: 2019).*

*Primary Examiner* — Emily P Pham
*Assistant Examiner* — Htet Z Kyaw
(74) *Attorney, Agent, or Firm* — Michael C. Stephens, Jr.

(57) ABSTRACT

A control circuit for a switching regulator can include: an ON signal generator that generates an ON signal; an OFF signal generator that generates a first control signal according to an input voltage and an output voltage of the switching regulator; an on time regulator that generates an adjustment signal according to a switching signal and the first control signal; and a logic circuit configured to generate an off signal according to the first control signal, and to generate the switching signal according to the ON signal and the OFF signal, where the on time of the first switch is regulated according to the off time of the first switch when the off time of the first switch is less than the reference time, in order to regulate a duty cycle of the switching signal.

20 Claims, 9 Drawing Sheets

(56) References Cited

U.S. PATENT DOCUMENTS

| | | | |
|---|---|---|---|
| 7,482,793 B2 | 1/2009 | Stoichita | |
| 8,427,128 B2 | 4/2013 | Tsai | |
| 8,493,048 B2 | 7/2013 | Zhang | |
| 8,717,002 B2 | 5/2014 | Xi | |
| 8,736,236 B2 | 5/2014 | Sun et al. | |
| 8,749,213 B2 | 6/2014 | Chen | |
| 8,749,216 B2 | 6/2014 | Li et al. | |
| 8,773,090 B2 | 7/2014 | Ouyang et al. | |
| 8,890,500 B2 * | 11/2014 | Cheng | G05F 1/10 323/283 |
| 8,917,073 B2 | 12/2014 | Yang et al. | |
| 8,970,194 B2 | 3/2015 | Li | |
| 9,059,632 B2 | 6/2015 | Li et al. | |
| 9,081,397 B2 | 7/2015 | Jiang et al. | |
| 9,081,401 B2 | 7/2015 | Liao et al. | |
| 9,385,601 B2 | 7/2016 | Nguyen et al. | |
| 9,385,603 B2 | 7/2016 | Hang et al. | |
| 9,529,373 B2 | 12/2016 | Yuan | |
| 9,543,822 B2 | 1/2017 | Hang et al. | |
| 9,559,591 B2 | 1/2017 | Hang et al. | |
| 9,614,437 B2 | 4/2017 | Yuan | |
| 9,653,992 B2 | 5/2017 | Yuan et al. | |
| 9,653,996 B2 | 5/2017 | Parto et al. | |
| 9,698,690 B2 | 7/2017 | Hang | |
| 9,716,432 B2 | 7/2017 | Ouyang | |
| 10,205,448 B2 * | 2/2019 | Xu | H03K 17/284 |
| 10,418,902 B1 * | 9/2019 | Dharmalinggam | H02M 1/0061 |
| 2002/0017897 A1 * | 2/2002 | Wilcox | H02M 3/156 323/282 |
| 2007/0194759 A1 | 8/2007 | Shimizu et al. | |
| 2007/0222395 A1 | 9/2007 | Chen et al. | |
| 2008/0030181 A1 * | 2/2008 | Liu | H02M 3/157 323/283 |
| 2008/0088284 A1 | 4/2008 | Weng | |
| 2008/0224681 A1 | 9/2008 | Padure et al. | |
| 2010/0134080 A1 | 6/2010 | Ouyang | |
| 2010/0219803 A1 | 9/2010 | Han et al. | |
| 2012/0043951 A1 * | 2/2012 | Kuo | H02M 3/158 323/282 |
| 2012/0299562 A1 | 11/2012 | Noda | |
| 2012/0299569 A1 * | 11/2012 | Zhang | H02M 3/1563 323/283 |
| 2013/0002221 A1 | 1/2013 | Wang et al. | |
| 2013/0063102 A1 | 3/2013 | Chen | |
| 2013/0063105 A1 | 3/2013 | Nishida et al. | |
| 2013/0249511 A1 | 9/2013 | Kalje et al. | |
| 2013/0313974 A1 | 11/2013 | Fan et al. | |
| 2014/0049235 A1 | 2/2014 | Li et al. | |
| 2014/0159689 A1 | 6/2014 | Chen | |
| 2014/0159695 A1 | 6/2014 | Jin | |
| 2014/0210534 A1 * | 7/2014 | Wang | H03K 7/08 327/175 |
| 2014/0266110 A1 | 9/2014 | Yuan et al. | |
| 2014/0306677 A1 | 10/2014 | Zhao | |
| 2015/0177756 A1 | 6/2015 | Yuan | |
| 2015/0180341 A1 * | 6/2015 | Yuan | H02M 3/156 323/271 |
| 2015/0245434 A1 | 8/2015 | Xu | |
| 2015/0280557 A1 * | 10/2015 | Xue | H02M 3/156 323/271 |
| 2015/0311810 A1 | 10/2015 | Chen et al. | |
| 2016/0226382 A1 * | 8/2016 | Li | H02M 3/158 |
| 2016/0366733 A1 | 12/2016 | Wang et al. | |
| 2017/0187295 A1 | 6/2017 | Chen et al. | |
| 2017/0244320 A1 | 8/2017 | Kawano et al. | |
| 2017/0302175 A1 | 10/2017 | Mao et al. | |
| 2017/0338738 A1 | 11/2017 | Sun | |

* cited by examiner

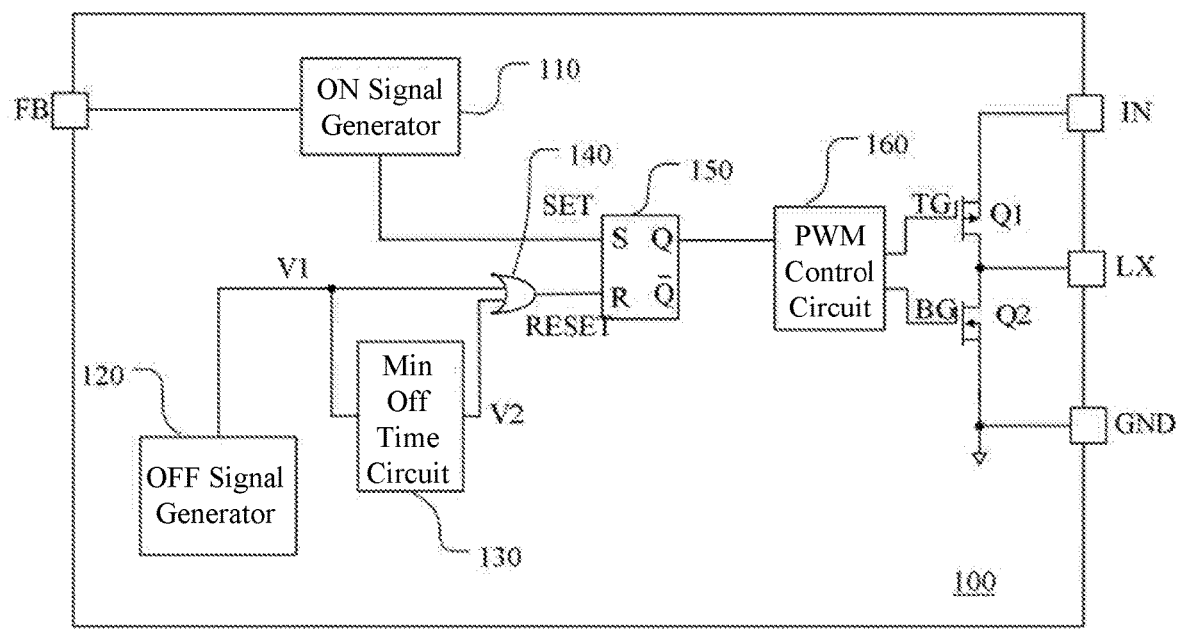
FIG. 1 (conventional)

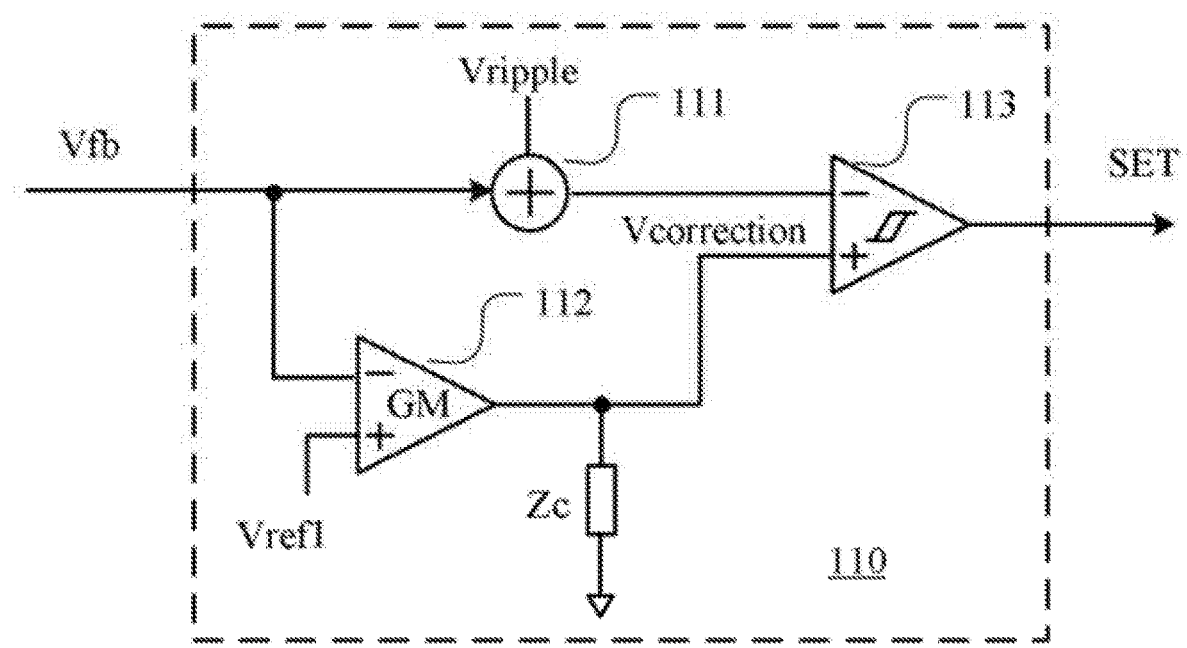
FIG. 2 (conventional)

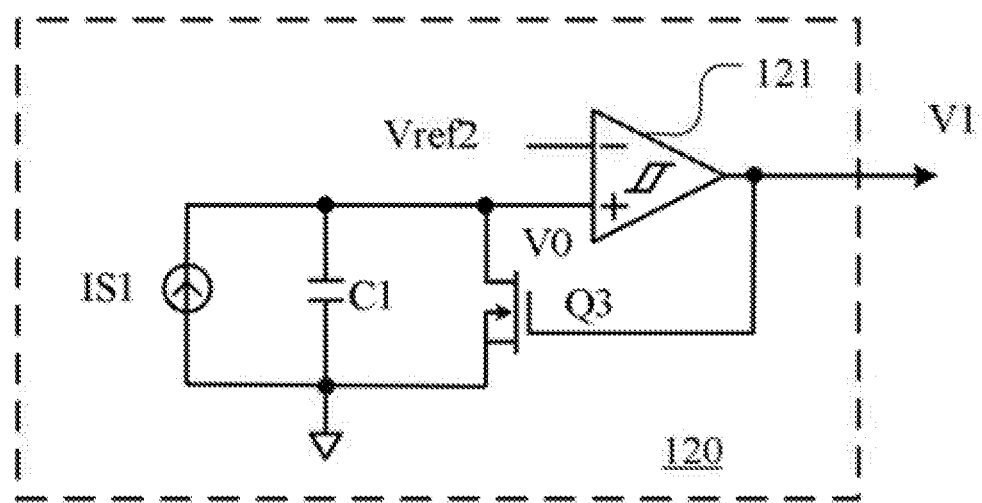
FIG. 3 (conventional)

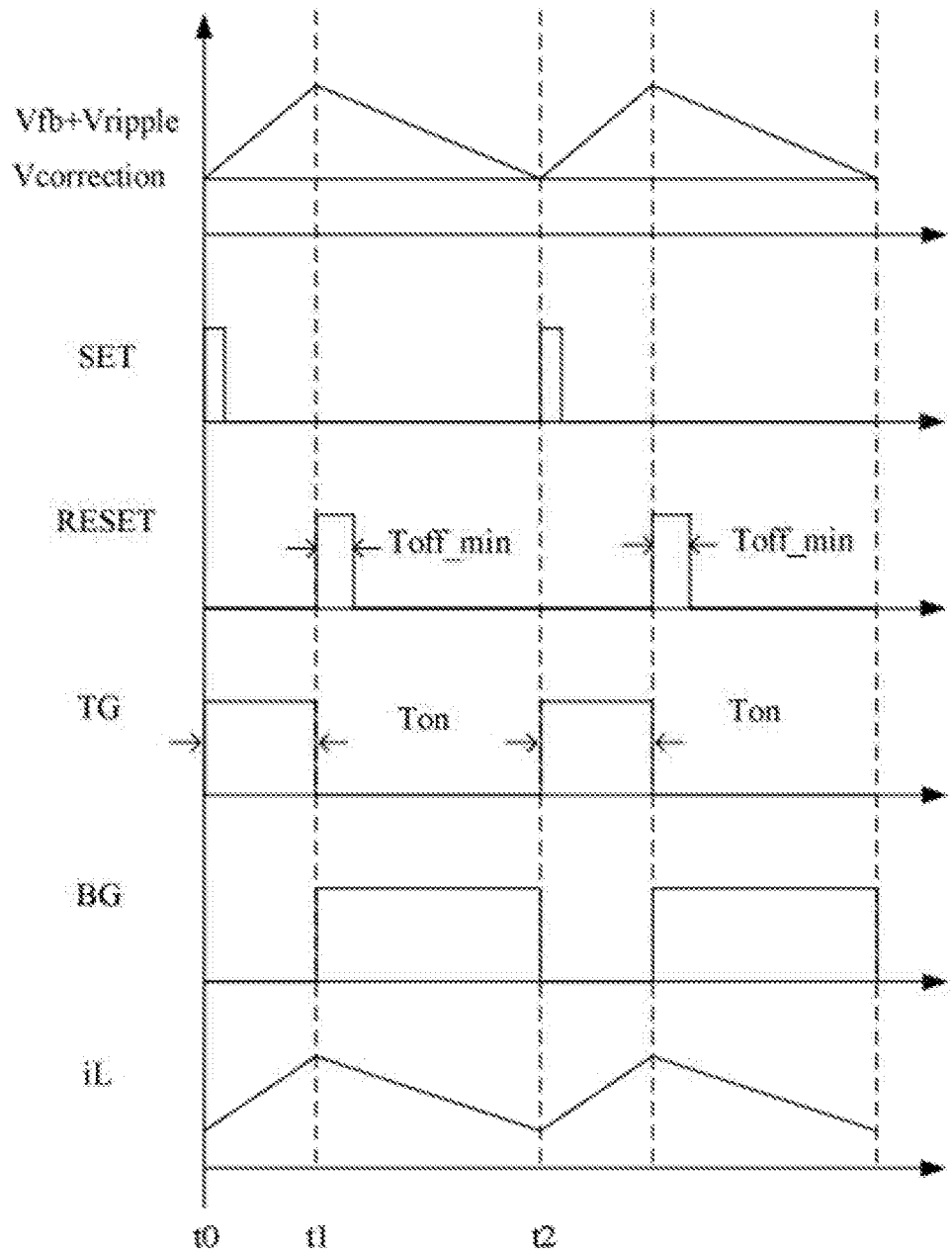
FIG. 4 (conventional)

CONTROL CIRCUIT AND CONTROL METHOD FOR SWITCHING REGULATOR AND SWITCHING REGULATOR WITH THE SAME

RELATED APPLICATIONS

This application is a continuation of the following application, U.S. patent application Ser. No. 15/582,881, filed on May 1, 2017, and which is hereby incorporated by reference as if it is set forth in full in this specification, and which also claims the benefit of Chinese Patent Application No. 201610334131.2, filed on May 18, 2016, which is incorporated herein by reference in its entirety.

FIELD OF THE INVENTION

The present invention generally relates to the field of switching power supplies, and more particularly to control circuits and methods for a switching regulator.

BACKGROUND

Switch mode power supplies can efficiently convert electrical power from a source to a load, or to several different loads, with each corresponding to a different output. The main transistor of a switching-mode supply can switch between on and off states at a given operating frequency, and voltage regulation can be achieved by varying the ratio of the on-to-off time of the main transistor. Switch mode power supplies may have relatively high power conversion efficiency, as compared to other types of power converters. Switch mode power supplies may also be substantially smaller and lighter than a linear supply due to the smaller transformer size and weight.

BRIEF DESCRIPTION OF THE DRAWINGS

FIG. 1 is a schematic block diagram of an example switching regulator.

FIG. 2 is a schematic block diagram of an example ON signal generator used in the switching regulator of FIG. 1.

FIG. 3 is a schematic block diagram of an example OFF signal generator used in the switching regulator of FIG. 1.

FIG. 4 is a waveform diagram of example operation of the switching regulator of FIG. 1.

DETAILED DESCRIPTION

Figure 5:
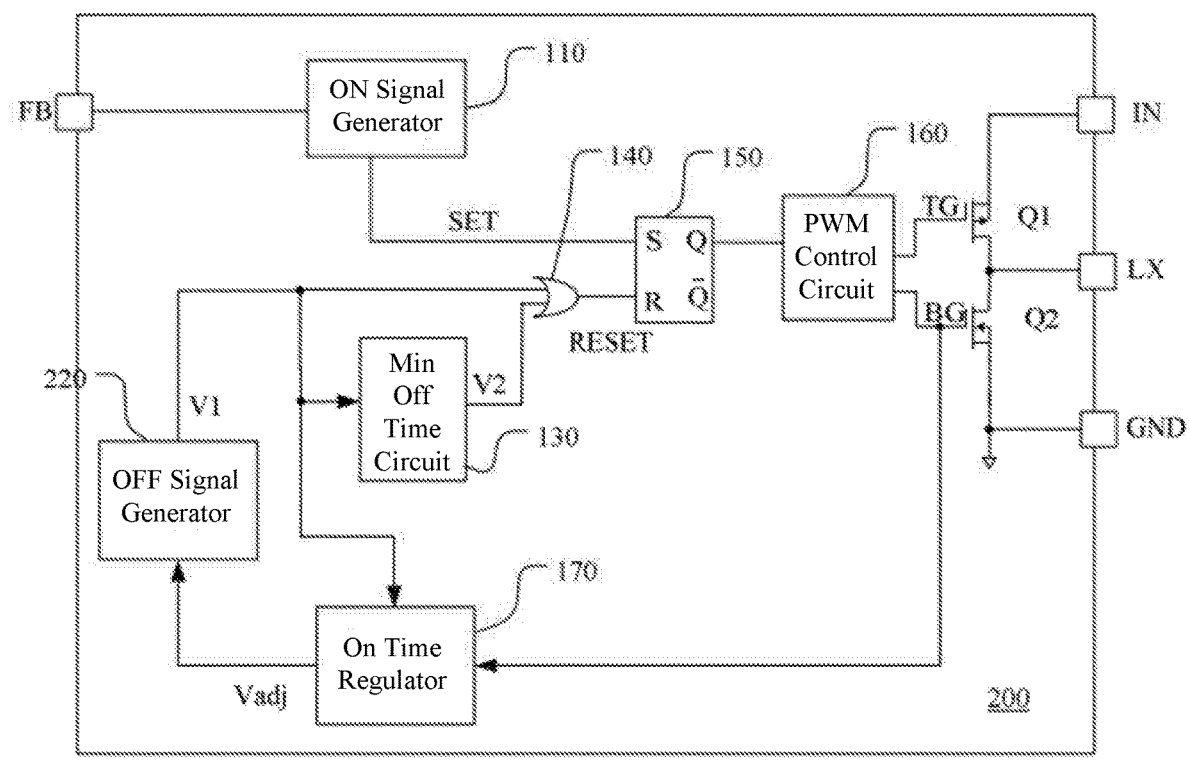
FIG. 5 is a schematic block diagram of an example switching regulator, in accordance with embodiments of the present invention.

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Switching regulators are typically used to power a load by converting an input voltage to a predetermined output voltage. Generally, a switching regulator includes a main switch, a synchronous switch, an inductor, and a control circuit. The control circuit can be used to control the main switch and the synchronous switch to turn on and off, such that the inductor alternately stores and releases energy, and an output voltage and/or an output current is generated.

The turning-on moment of the main power switch controlled by comparing a superimposed signal of a feedback signal and a ripple signal against a first reference signal in a constant on time mode together with a ripple control mode. The turning-off moment of the main power switch can be controlled by comparing a ramp signal against a second reference signal that is generated according to the output voltage. The synchronous switch may be off when the main switch is on, and can be on as a freewheeling switch when the main switch is off. In each switching period, the on time of the main switch may be substantially constant, while the off time is variable according to the feedback signal, in order to regulate the duty cycle of the switching signal and maintain the output voltage and/or current constant.

In some cases, the turning on and turning off of the main switch and the synchronous switch may produce noise signals, which can result in malfunction of the switches and control failures in the above-described control approach. In another control approach, a minimum off time circuit can be used to maintain the off time of the main switch and the on time of the synchronous switch as lasting for a time at least as long as a predetermined minimum off time after the main switch is turned off, in order to suppress the interference of the noise signal. However, in a switching regulator with a minimum off time circuit, the off time of the main switch should be longer than or equal to the minimum off time. Thus, the duty cycle of the switching signal may accordingly be less than or equal to the maximum duty cycle. Therefore, the regulation range of the output voltage and/or the output current of the switching regulator may be limited in this case.

Referring now to FIG. 1, shown is a schematic block diagram of an example switching regulator. Switching regulator 100 and include a control circuit and a first portion of the power stage, which may be integrated in one integrated circuit (IC) chip. The control circuit can include ON signal generator 110, OFF signal generator 120, minimum off time circuit 130, AND-gate 140, RS flip-flop 150, and PWM control circuit 160. The first portion of the power stage can include switches Q1 and Q2. For example, the second portion of the power stage can include discrete components (e.g., an inductor, a capacitor, etc.) and a load, which may be located outside of the integrated circuit that is shown.

Switching regulator 100 can supply an output voltage for a load. In this particular example, the integrated circuit chip of the switching regulator can include four pins: IN (input pin), LX (output pin), GND (ground pin), and FB (feedback pin). Feedback pin FB can provide feedback signal Vfb that represents the output voltage to the control circuit of switching regulator 100. For example, switches Q1 and Q2 of the power stage can be coupled in series. A first terminal of switch Q1 can connect to input pin IN to receive the input voltage. A second terminal of switch Q2 can connect to ground pin GND for a ground connection. A second terminal of switch Q1 and a first terminal of switch Q2 can connect to output pin LX to provide a charge path and a discharge path for an external inductor.

In switching regulator 100, ON signal generator 110 can generate ON signal SET according to feedback signal Vfb, which may represent output voltage Vout of the switching regulator. OFF signal generator 120 can generate control signal V1 according to input voltage Vin and output voltage Vout of the switching regulator. The input terminal of minimum off time circuit 130 can connect to the output terminal of OFF signal generator 120 for receiving control signal V1, and generating control signal V2 according to control signal V1. Two input terminals of AND-gate 140 may receive control signals V1 and V2, for generating OFF signal RESET according to control signals V1 and V2. The set and reset terminals of RS flip-flop 150 can receive ON signal SET and OFF signal RESET, respectively, and the output terminal thereof may provide a switching signal.

Minimum off time circuit 130 (e.g., a timing circuit) can maintain a predetermined reference time from when control signal V1 is activated, and control signal V2 is deactivated. Pulse-width modulation (PWM) control circuit 160 can receive the switching signal, and may provide driving signals TG and BG for respectively driving switches Q1 and Q2. For example, driving signals TG and BG may respectively be in the same phase and in the opposite phase as the switching signal. In each switching cycle, switches Q1 and Q2 can alternately be turned on and off for charging and discharging the inductor, so as to provide the output voltage for the load. The output voltage can be maintained as substantially constant by regulating the duty cycle of the switching signal.

Referring now to FIG. 2, shown is a schematic block diagram of an example ON signal generator used in the switching regulator of FIG. 1. ON signal generator 110 can include superimpose circuit 111, amplifier 112, comparator 113, and resistor Zc. Superimpose circuit 111 can connect between feedback pin FB of switching regulator 100 and the inverting input terminal of comparator 113. Superimpose circuit 111 can receive feedback signal Vfb of the output voltage, and superimpose feedback signal Vfb and ripple signal Vripple, thereby generating a superimposed signal of both. For example, ripple signal Vripple is an AC signal, and the superimposed signal is a DC signal that includes a ripple component.

Amplifier 112 may be coupled between feedback pin FB of switching regulator 100 and the non-inverting input terminal of comparator 113. The inverting input terminal and the non-inverting input terminal of amplifier 112 can respectively receive feedback signal Vfb of the output voltage and reference voltage Vref1. The output terminal of amplifier 112 can connect to the non-inverting input terminal of comparator 113, and may be coupled to ground through resistor Rz. Amplifier 112 may provide a difference signal of reference voltage Vref1 and feedback signal Vfb as correction signal Vcorrection. Comparator 113 can compare a superimposed signal of feedback signal Vfb and ripple signal Vripple against correction signal Vcorrection, to thereby generate ON signal SET.

Referring now to FIG. 3, shown is a schematic block diagram of an example OFF signal generator used in the switching regulator of FIG. 1. OFF signal generator 120 can include comparator 121, current source IS1, capacitor C1, and switch Q3. Comparator 121 may have an inverting input terminal and a non-inverting input terminal for receiving and comparing reference voltage Vref2 and voltage signal V0, and an output terminal for providing control signal V1. For example, reference voltage Vref2 is proportional to output voltage Vout of switching regulator 100 (e.g., Vref2=K1*Vout, where K1 is a first proportion factor with a constant value).

Current source IS1, capacitor C1, and switch Q3 can be coupled between the non-inverting input terminal of comparator 121 and ground, so as to form a charge and discharge circuit. The charge and discharge circuit can generate voltage signal V0. The control terminal of switch Q3 can connect to the output terminal of comparator 121. For example, current value I1 of current source IS1 is proportional to input voltage Vin of switching regulator 100 (e.g., I1=K2*Vin, where K2 is a second proportion factor with a constant value). When control signal V1 is inactive, switch Q3 is off, and current source IS1 can charge capacitor C1, such that a voltage at the non-inverting input terminal of comparator 121 rises until it is higher than reference voltage Vref2, and control signal V1 at the output of comparator 121 is activated. When control signal V1 is active, switch Q3 is turned on, and capacitor C1 may be discharged through switch Q3, such that the voltage at the non-inverting input terminal of comparator 121 decreases.

Referring now to FIG. 4, shown is a waveform diagram of example operation of the switching regulator of FIG. 1. This particular example can include superimposed signal Vfb+ Vripple of feedback signal Vfb and ripple signal Vripple, ON signal SET, OFF signal RESET, driving signals TG and BG, and inductor current iL which may all vary with time. For example, driving signals TG and BG may respectively be in the same phase and in the opposite phase as the switching signal, for controlling switches Q1 and Q2. In the example switching regulator 100 of FIG. 1, ON signal generator 110 generates ON signal SET, and OFF signal generator 120 and minimum off time circuit 130 respectively provide control signals V1 and V2 to AND-gate 140, to OFF signal RESET. RS flip-flop 150 may have a set terminal and a reset terminal for respectively receiving ON signal SET and OFF signal RESET, and can generate the switching signal at an output thereof.

In each switching cycle, the superimposed signal of feedback signal Vfb and ripple signal Vripple can control the turning on moment t0 of switch Q1. Control signals V1 and V2 can together control the turning off moment t1 of switch Q1. On time Ton of switch Q1 may represent the time duration during which the switching signal is active, and off time Toff may represent the time duration during which the switching signal is inactive. When switch Q1 is on, the superimposed signal can be approximately linearly increased, and when switch Q1 is off, the superimposed signal may be approximately linearly decreased.

For example, at time t0, when the superimposed signal in the previous switching period is reduced below Vcorrection, ON signal SET can be activated, and OFF signal RESET may remain inactive. As a result, the switching signal can be activated, and switch Q1 may be turned on. When switch Q1 is turned on, capacitor C1 in OFF signal generator 120 and be charged. For example, at time t1, when capacitor C1 in OFF signal generator is charged above reference voltage Vref2, OFF signal RESET can be activated, and ON signal SET may remain inactive. As a result, the switching signal can be deactivated, and switch Q1 may be turned off. When switch Q1 is turned off, capacitor C1 in OFF signal generator 120 can be discharged.

For example, at time t2, when the superimposed signal in the current switching period is reduced below Vcorrection, ON signal SET can be activated, and OFF signal RESET may remain inactive. As a result, the switching signal can be activated, and switch Q1 may again be turned on to start the next switching period. In this example switching cycle, on time Ton of switch Q1 lasts from time t0 to time t1, and off time Toff lasts from time t1 to time t2. As mentioned above, on time Ton of switch Q1 can be determined by the charging process of capacitor C1 in the OFF signal generator. When capacitor C1 is charged by current source IS1, on time Ton of switch Q1 may be substantially constant.

In some cases, the turning on and turning off of switch Q1 and/or switch Q2 may produce noise signals, which may result in malfunction of the switches and associated control failures in such a control approach. In another control approach, minimum off time circuit 130 be used to maintain the off time of switch Q1 to last for a time that is at least longer than predetermined minimum off time Toff_min after the turning off moment t1 of switch Q1. This approach can suppress the interference of the noise signals. Minimum off time circuit 130 (e.g., a timing circuit) can maintain switch Q1 to remain off for a predetermined reference time after time t1. Thus, the off time of switch Q1 (e.g., the time period from time t0 to t1) should be at least longer than minimum off time Toff_min. In this example control approach of the switching regulator, the maximum duty cycle of the switching signal can be: Dmax=Ton/(Ton+Toff_min). Therefore, when the switching regulator is at a relatively large output voltage Vout state, the regulating range of the duty cycle of the switching signal may be greater than maximum duty cycle Dmax. In such a case, the switching regulator may be unable to regulate output voltage Vout, possibly resulting in control failure due to saturation of the control range.

In one embodiment, a control circuit for a switching regulator having a first switch, can include: (i) an ON signal generator configured to generate an ON signal; (ii) an OFF signal generator configured to generate a first control signal according to an input voltage and an output voltage of the switching regulator; (iii) an on time regulator configured to generate an adjustment signal according to a switching signal and the first control signal, where an on time of the first switch is controlled to be a constant on time when an off time of the first switch is greater than or equal to a reference time; and (iv) a logic circuit configured to generate an off signal according to the first control signal, and to generate the switching signal according to the ON signal and the OFF signal, where the on time of the first switch is regulated according to the off time of the first switch when the off time of the first switch is less than the reference time, in order to regulate a duty cycle of the switching signal.

Referring now to FIG. 5, shown is a schematic block diagram of an example switching regulator, in accordance with embodiments of the present invention. Switching regulator 200 and include a control circuit and a first portion of the power stage, which can be integrated in one integrated circuit (IC) chip. The control circuit can include ON signal generator 110, OFF signal generator 220, minimum off time circuit 130, AND-gate 140, RS flip-flop 150, and PWM control circuit 160. The first portion in the power stage and include switches Q1 and Q2. For example, a second portion of the power stage can include discrete components (e.g., an inductor, a capacitor, etc.) and a load, which can be located outside the integrated circuit that is shown.

Switching regulator 200 can supply an output voltage for a load. In this example, the integrated circuit chip of the switching regulator can include four pins: IN (input pin), LX (output pin), GND (ground pin), and FB (feedback pin). The feedback pin FB can provide a feedback signal Vfb that represents the output voltage to the control circuit of the switching regulator 200. As an example, switches Q1 and Q2 of the power stage can be coupled in series. A first terminal of switch Q1 can connect pin IN to receive the input voltage. A second terminal of switch Q2 can connect to ground pin GND for a ground connection. A second terminal of switch Q1 and a first terminal of switch Q2 can connect to output pin LX to provide a charge path and a discharge path for an external inductor.

In switching regulator 200, ON signal generator 110 can generate ON signal SET according to feedback signal Vfb, which may represent output voltage Vout of the switching regulator. OFF signal generator 220 can generate control signal V1 according to input voltage Vin and output voltage Vout of the switching regulator. The input terminal of minimum off time circuit 130 can connect the output terminal of OFF signal generator 220 for receiving control signal V1, and generating control signal V2 according to control signal V1. Two input terminals of AND-gate 140 can receive control signals V1 and V2, in order to generate OFF signal RESET according control signals V1 and V2. The set terminal and reset terminal of RS flip-flop 220 can respectively receive ON signal SET and OFF signal RESET, and the output terminal thereof may provide a switching signal. Minimum off time circuit 130 (e.g., a timing circuit) can maintain a predetermined reference time from when control signal V1 is activated, and control signal V2 is deactivated. PWM control circuit 160 can receive the switching signal, and may provide driving signals TG and BG for respectively driving switches Q1 and Q2. For example, driving signals TG and BG may respectively be in the same phase and in the opposite phase as the switching signal.

On time regulator 170 can connect between an output terminal of PWM control circuit 160 and the input terminal of OFF signal generator 220. On time regulator 170 can generate adjustment signal Vadj according to driving signal BG and control signal V1. Alternatively, on time regulator 170 can generate adjustment signal Vadj together with control signal V1 according to one or more of the switching signal and driving signals TG and BG. For example, driving signals TG and BG may respectively be in the same phase and in the opposite phase as the switching signal. In each switching cycle, switches Q1 and Q2 may be alternately turned on and off for charging and discharging the inductor, order to provide the output voltage for the load. For example, the output voltage can be maintained as substantially constant by regulating the duty cycle of the switching signal.

In this example, on time regulator 170 may obtain off time Toff of switch Q1 according to the switching signal, and the turning off moment of switch Q1 according to control signal V1. On time regulator 170 can begin timing the reference time in order to compare off time Toff of switch Q1 against the reference time. When the off time of switch Q1 is greater than or equal to the reference time, on time regulator 170 can control on time Ton of switch Q1 to be a constant on time. When the off time of switch Q1 is less than the reference time, on time regulator 170 may regulate on time Ton of switch Q1 according to off time Toff of switch Q1, in order to regulate duty cycle D of the switching signal. For example, the reference time is greater than or equal to minimum off time Toff_min.

In this way, switching regulator 200 may regulate on time Ton of switch Q1 in a negative feedback manner according to the duty cycle of the switching signal at a relatively large output voltage state. Even if the off time of switch Q1 reaches minimum off time Toff_min, switching regulator 200 can also reduce on time Ton of switch Q1, and improve the duty cycle of the switching signal by automatically decreasing the frequency with respect to the predetermined constant on time. In this example, the control circuit of the switching regulator including the minimum off time circuit may be used to maintain the switch as remaining off for at least the minimum off time after the switch has been turned off.

Alternatively, the minimum off time circuit can be omitted, such as where the on time regulator changes the operating mode of the switch between a constant on time and a variable on time based on a comparison result of the off time of the switch and the reference time. The operating mode of the switch can be the variable on time mode at the large output voltage state, so that the duty cycle can be changed by regulating the on time of the switch. Correspondingly, in the case of the same duty cycle, the control circuit can prolong the on time of the switch (e.g., shortens the off time of the switch) in order to suppress the noise signals.

Figure 6:
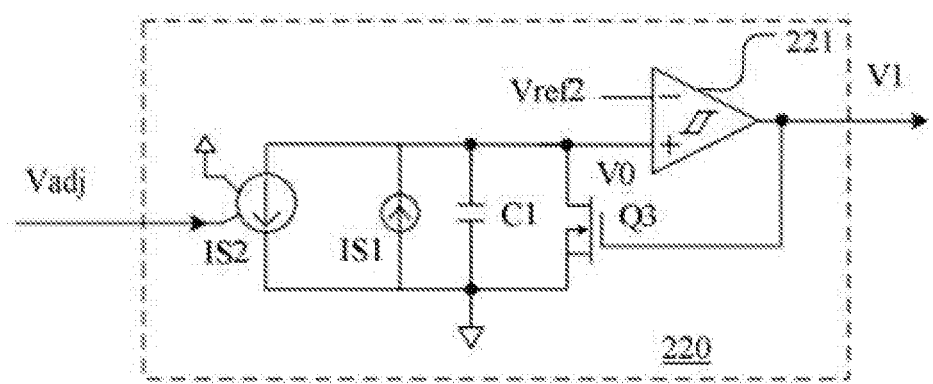
FIG. 6 is a schematic block diagram of an example OFF signal generator used in the switching regulator of FIG. 5, in accordance with embodiments of the present invention.

Referring now to FIG. 6, shown is a schematic block diagram of an example OFF signal generator used in the switching regulator of FIG. 5, in accordance with embodiments of the present invention. OFF signal generator 220 can include comparator 221, current sources IS1 and IS2, capacitor C1, and switch Q3. Comparator 221 may have an inverting input terminal and a non-inverting input terminal for receiving and comparing reference voltage Vref2 and voltage signal V0, and an output terminal for providing control signal V1. For example, reference voltage Vref2 is proportional to output voltage Vout of switching regulator 100 (e.g., Vref2=K1*Vout, where K1 is a first proportion factor with a constant value).

Current source IS1, current source IS2, capacitor C1, and switch Q3 may be coupled in parallel between the non-inverting input terminal of comparator 221 and ground, so as to form a charge and discharge circuit. The charge and discharge circuit can generate voltage signal V0. The control terminal of switch Q3 can connect to the output terminal of comparator 221. For example, current value I1 of current source IS1 is proportional to input voltage Vin of switching regulator 100 (e.g., I1=K2*Vin, where K2 is a second proportion factor with a constant value). Current value I2 of the current source IS2 may be proportional to input voltage Vin of switching regulator 100, and current source IS2 may be a voltage controlled current source (e.g., I2=K3*Vin, where K3 is a third proportion factor related to the voltage at the control terminal).

When control signal V1 is inactive, switch Q3 may be off, and current sources IS1 and IS2 charge capacitor C1 such that a voltage at the non-inverting input terminal of comparator 221 rises until it is higher than reference voltage Vref2, and control signal V1 at the output terminal of comparator 221 is activated. When control signal V1 is activated, switch Q3 may be turned on, and capacitor C1 can be discharged through switch Q3 such that the voltage at the non-inverting input terminal of comparator 221 decreases.

In this example OFF signal generator 220, current source IS2 is a voltage controlled current source with its control terminal being used to receive adjustment signal Vadj. Thus, OFF signal generator 220 may regulate the turning off moment in the switching period according to regulation current I2 of current source IS2 in order to change on time Ton of switch Q1. When off time Toff of switch Q1 is less than the reference time, adjustment signal Vadj is a constant voltage, and as such on time Ton of switch Q1 is a constant on time. When off time of switch Q1 is less than the reference time, adjustment signal Vadj is in inversely proportional to off time Toff of switch Q1, and as such on time Ton of switch Q1 may vary in a negative feedback manner. Thus, the duty cycle of the switching signal can be improved by automatically decreasing the frequency with respect to the predetermined constant on time.

Figure 7:
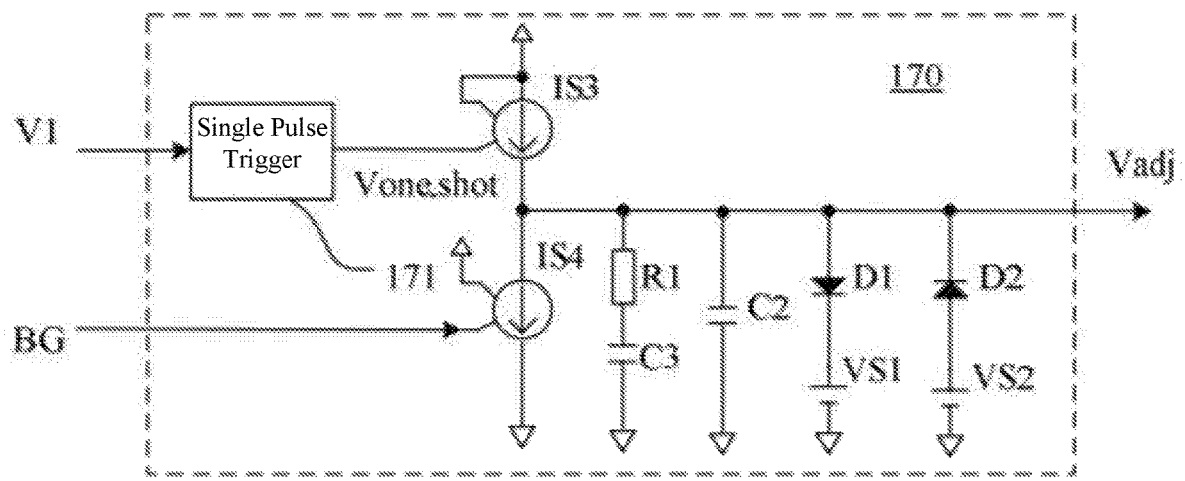
FIG. 7 is a schematic block diagram of an example ON time regulator used in the switching regulator of FIG. 5, in accordance with embodiments of the present invention.

Referring now to FIG. 7, shown is a schematic block diagram of an example ON time regulator used in the switching regulator of FIG. 5, in accordance with embodiments of the present invention. ON time regulator 170 can include single-trigger circuit 171, current sources IS3 and IS4, voltage sources VS1 and VS2, diodes D1 and D2, capacitors C2 and C3, and resistor R1. Current sources IS3 and IS4 can be coupled in series between a power terminal and ground, and capacitor C2 may be coupled between a common node of current sources IS3 and IS4 and ground, so as to form a charge and discharge circuit. Resistor R1 and capacitor C3 can be coupled in series to form a delay circuit, which is coupled in parallel with capacitor C2. The cathode of diode D1 can connect to the anode of voltage source VS1 to form a upper clamp circuit, which is coupled in parallel with capacitor C2, and the anode of diode D1 can connect to the high potential end of capacitor C2. The anode of diode D2 can connect to the anode of voltage source VS2 to form a lower clamp circuit, which is coupled in parallel with capacitor C2, and the cathode of diode D2 can connect to the high potential end of capacitor C2.

Single-trigger circuit 171 can generate single-trigger signal Vone_shot according to control signal V1, and the time duration during which single-trigger signal Vone_shot is active may be equal to the reference time. Current sources IS3 and IS4 may both be voltage controlled current sources, with their control terminals respectively receiving the single-trigger signal and the switching signal. Alternatively, current source IS4 can receive driving signal TG and driving signal BG corresponding to the switching signal. When single-trigger signal Vone_shot is active, current source IS3 can charge capacitor C2. When the switching signal is inactive, driving signal TG is inactive and driving signal BG is active, and capacitor C2 discharges current source IS4 in order to generate adjustment signal Vadj across capacitor C2.

In this particular example, the delay circuit may be used to effectively smooth the fluctuation of the adjustment signal, and the upper and lower clamp circuits may be respectively used to regulate the upper and lower voltage values of the adjustment signal. In an alternative example, if the adjustment signal meets the control requirements, at least one of the delay circuit and the upper and lower clamp circuits can be omitted in some configurations.

Figure 8:
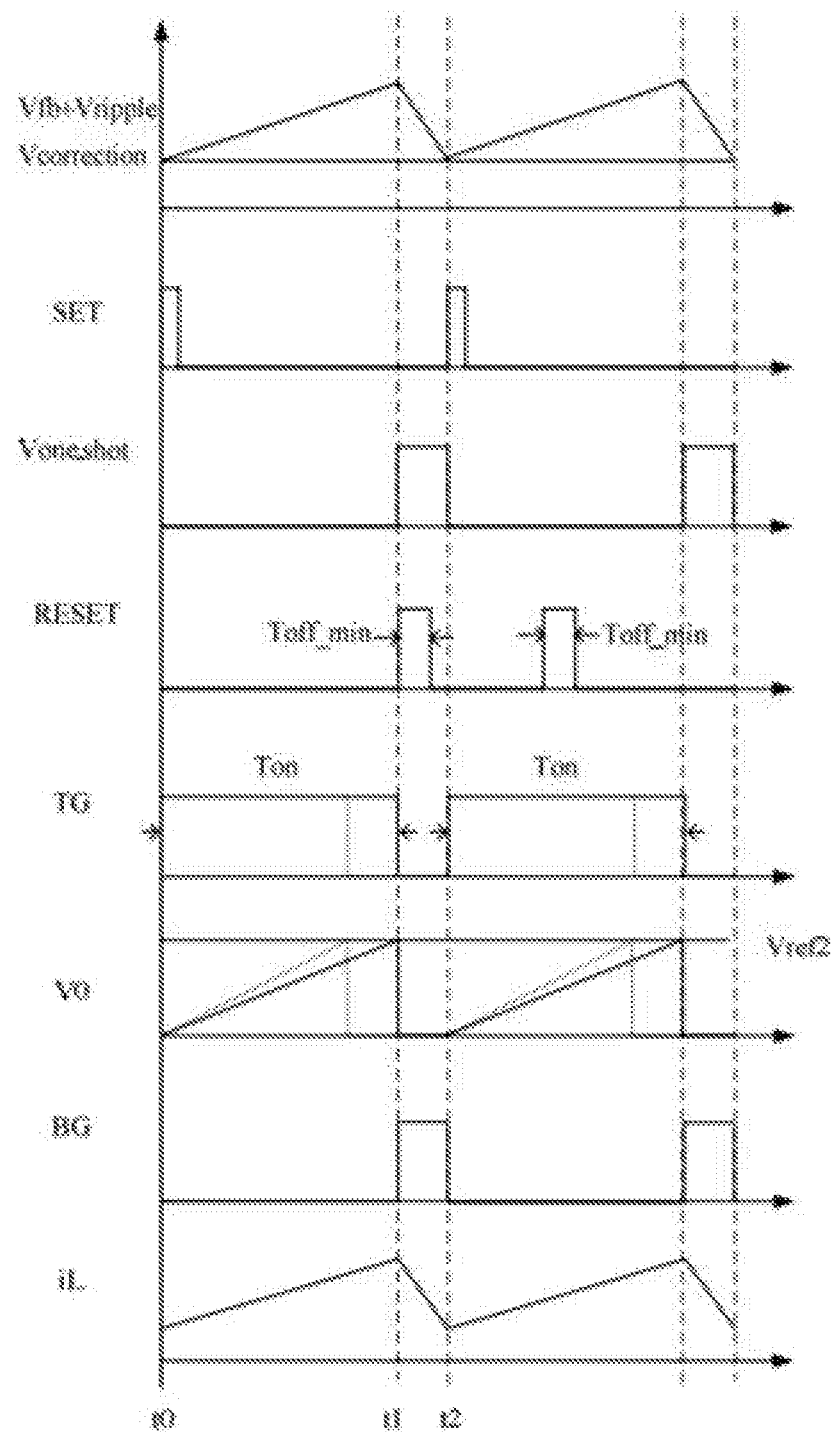
FIG. 8 is a waveform diagram of example operation of the switching regulator of FIG. 5, in accordance with embodiments of the present invention.

Referring now to FIG. 8, shown is a waveform diagram of example operation of the switching regulator of FIG. 5, in accordance with embodiments of the present invention. This particular example can include superimposed signal Vfb+Vripple of feedback signal Vfb and ripple signal Vripple, ON signal SET, single-trigger signal Vone_shot, OFF signal RESET, driving signal TG, voltage signal V0, driving signal BG, and inductor current iL which may all vary with respect to time. For example, driving signals TG and BG may be in the same phase and in the opposite phase as the switching signal for controlling switches Q1 and Q2. In switching regulator 200 of FIG. 5, ON signal generator 110 can generate ON signal SET, and OFF signal generator 220 and minimum off time circuit 130 may respectively provide control signal V1 and control signal V2 to AND-gate 140, and generate OFF signal RESET. RS flip-flop 150 can receive ON signal SET and the OFF signal RESET, and may generate the switching signal.

As shown in FIG. 8, in each switching cycle, the superimposed signal of feedback signal Vfb and ripple signal Vripple can control the turning on moment t0 of switch Q1, and control signals V1 and V2 can together control the turning off moment t1 of switch Q1. On time Ton of switch Q1 may represent the time duration during which the switching signal is active, and off time Toff may represent the time duration during which the switching signal is inactive. When switch Q1 is on, the superimposed signal can approximately be linearly increased, and when switch Q1 is off, the superimposed signal can approximately be linearly decreased. For example, at time t0, when the superimposed signal in the previous switching period is reduced below Vcorrection, ON signal SET can be activated, and OFF signal RESET may remain inactive. The switching signal can be activated, and switch Q1 may be turned on. When switch Q1 is turned on, capacitor C1 in OFF signal generator 220 can be charged.

For example, at time t1, when capacitor C1 in the OFF signal generator is charged above reference voltage Vref2, OFF signal RESET may be activated, and ON signal SET may remain inactive. The switching signal may be deactivated, and switch Q1 can be turned off. When switch Q1 is turned off, capacitor C1 in OFF signal generator 220 can be discharged. For example, at time t2, when the superimposed signal in the current switching period is reduced below Vcorrection, ON signal SET can be activated, and OFF signal RESET may remain inactive. The switching signal can be activated, and switch Q1 can again be turned on, and the next switching period is started.

In this example switching cycle, on time Ton of switch Q1 lasts from time t0 to time t1, and off time Toff lasts from time t1 to time t2. As mentioned above, capacitor C2 in on time regulator 170 can be charged and discharged according to off time Toff of switch Q1, and the charge and discharge process may determine the value of adjustment voltage Vadj. Capacitor C1 in OFF signal generator 220 can be charged and discharged according to adjustment signal Vadj, and the charge and discharge process may determine on time Ton of switch Q1. In on time regulator 170, when the off time of switch Q1 is greater than the reference time, current source IS3 can charge capacitor C2 such that the value of adjustment signal Vadj is proportional to off time Toff of switch Q1. When off time Toff of switch Q1 is less than or equal to the reference time, capacitor C2 can be discharged through current source IS4 such that the value of adjustment signal Vadj is substantially constant (e.g., adjustment signal Vadj is clamped at zero).

In OFF signal generator 220, capacitor C1 may be charged by current sources IS1 and IS2. Since current source IS2 is a voltage controlled current source, on time Ton of switch Q1 can be regulated according to adjustment signal Vadj. When off time Toff of switch Q1 is greater than the reference time, on time Ton of switch Q1 may be substantially constant. When off time Toff of switch Q1 is less than or equal to the reference time, on time Ton of switch Q1 can be regulated in a negative feedback manner according to off time Toff of switch Q1. In one example, minimum off time circuit 130 can be used to maintain the off time of switch Q1 to last for a time that is at least long as a predetermined minimum off time Toff_min after the turning off moment t1 of switch Q1, in order to substantially suppress the interference of the noise signals.

Minimum off time circuit 130 (e.g., a timing circuit) can be to maintain switch Q1 to remain off for a predetermined reference time after time t1. Thus, the off time of switch Q1 (e.g., the time period from time t0 to t1) should be at least as long as minimum off time Toff_min. In this case, the maximum duty cycle of the switching signal can be: Dmax=Ton/(Ton+Toff_min). The switching regulator may improve maximum duty cycle Dmax by prolonging the on time of the switch at a relatively large output voltage state, such that the regulation range of the duty cycle of the switching signal can be significantly increased.

While the above examples mainly describe implementation of the switching regulator having a constant on time control mode, particular embodiments may also be applied in a constant off time control mode. For a switching regulator of the constant off time control mode, in each switching period, when the on time of switch Q1 is less than the reference time, the off time of switch Q1 can be prolonged, where the reference time is greater than or equal to the minimum on time of the system. In a normal operating state, switch Q1 can be turned on after a constant off time. In the case of a relatively small duty cycle (e.g., when the on time of the first switch is less than the reference time), the off time of switch Q1 may be prolonged in order to automatically reduce the frequency increase system applications.

In one embodiment, a method of controlling a switching regulator having a first switch, can include: (i) generating a switching signal; (ii) controlling the turn on and off of the first switch by the switching signal; (iii) comparing an off time of the first switch against a reference time, and generating an adjustment signal; (iv) controlling an on time of the first switch according to the adjustment signal; (v) controlling, by the switching signal, the on time of the first switch to be a constant on time when the off time of the first switch is greater than or equal to a reference time; and (vi) regulating the on time of the first switch according to the off time of the first switch in order to regulate a duty cycle of the switching signal when the off time of the first switch is less than the reference time.

Figure 9:
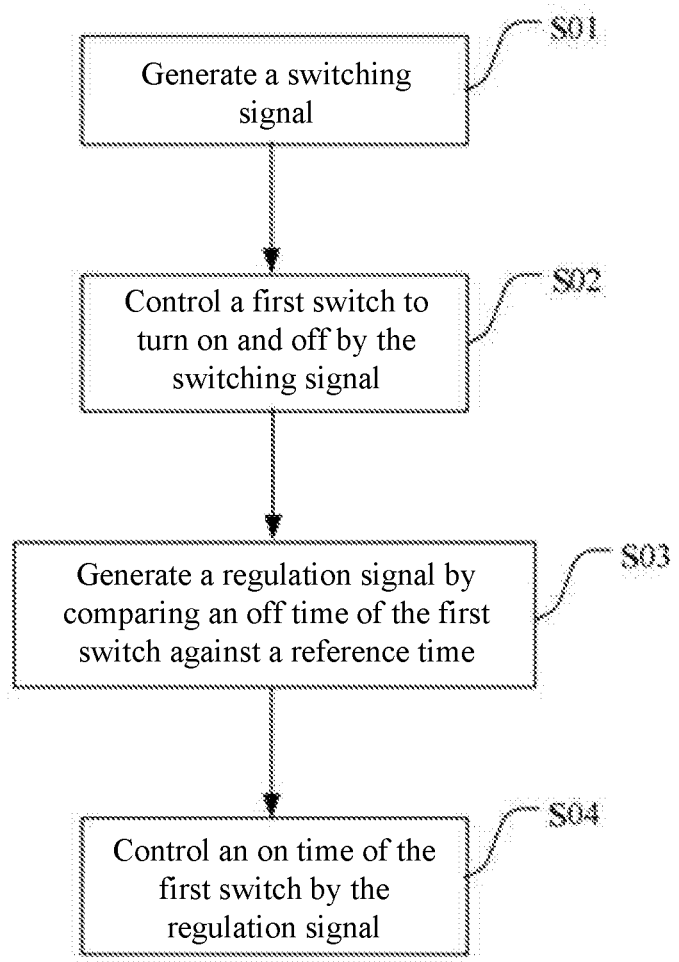
FIG. 9 is a flow diagram of an example method of controlling the switching regulator of FIG. 5, in accordance with embodiments of the present invention.

Referring now to FIG. 9, shown is a flow diagram of an example method of controlling the switching regulator of FIG. 5, in accordance with embodiments of the present invention. At S01, the switching signal can be generated. At S02, the first switch (e.g., Q1) can be turned on and off by the switching signal (e.g., via TG). At S03, the adjustment signal (e.g., Vadj) can be generated by comparing the off time of the first switch against the reference time. At S04, the on time of the first switch can be controlled according to the adjustment signal. In one example, generating the switching signal can include generating the ON signal in a ripple control mode, generating the first control signal according to the input voltage and the output voltage of the switching regulator, generating the off signal according to the first control, signal and generating the switching signal according to the ON signal and the OFF signal.

In one example, the generating the adjustment signal can include generating the single-trigger signal according to the first control signal, where the time duration during which the single-trigger signal is active equals to the reference time. Generating the adjustment signal can also include generating according to the single-trigger signal and the switching signal. When the time duration during which the single-trigger signal is active is greater than or equal to the time duration during which the switching signal is active, the first capacitor (e.g., C1) can be charged. When the time duration during which the single-trigger signal is active is less than the time duration during which the switching signal is inactive, the first capacitor can be discharged. In such a control mode, the off time of the first switch may be greater than or equal to the reference time, and the switching signal can control the on time of the first switch to be a constant on time. When the off time of the first switch is less than the reference time, the on time of the first switch may be regulated according to the off time of the first switch in order to regulate the duty cycle of the switching signal.

In one example, generating the adjustment signal can include generating the single-trigger signal according to the first control signal, where the time duration during which the single-trigger signal is active equals to the reference time. Generating the adjustment signal can be according to the single-trigger signal and the switching signal. When the time duration during which the single-trigger signal is active is greater than or equal to the time duration during which the switching signal is active, the first capacitor can be charged. When the time duration during which the single-trigger signal is active is less than the time duration during which the switching signal is inactive, the first capacitor may be discharged. In one example, the on time of the first switch can be regulated according to the adjustment signal, and the transition time of the first control signal may be regulated according to the adjustment signal in order to change the on time of the first switch.

In one example, generating the first control signal can include charging and discharging a second capacitor, and comparing the first voltage signal and the reference voltage. When the first control signal is inactive, the adjustable first current and the constant second current can charge the second capacitor. When the first control signal is inactive, the second capacitor may be discharged, where the reference voltage is proportional to the output voltage, the first current is proportional to the high voltage, the second current is inversely proportional to the input voltage, and the second current has an opposite direction to the first current.

In one example, the second switch can be turned on and off by the switching signal, such that the first and second switches are alternately turned on and off. In one example, the second control signal is generated according to the first control signal, and the second control signal may be used to maintain the first switch as off for a time that is at least as long as the minimum off time, where the reference time is greater than or equal to the minimum off time.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A control circuit for a switching regulator having a first switch, the control circuit comprising:
   a) a first trigger circuit configured to control a starting moment of a first type time interval in a switching period;
   b) a second trigger circuit configured to control a length of said first type time interval;
   c) a time regulator configured to generate an adjustment signal to regulate said length of said first type time interval by comparing a second type time interval in said switching period against a reference time; and
   d) wherein said length of said first type time interval is controlled to be constant when in a first state, and said length of said first type time interval is regulated correspondingly to improve a regulation range of an output signal of said switching regulator when in a second state.

2. The control circuit of claim 1, wherein said second trigger circuit comprises a comparator configured to compare a reference voltage and a first voltage signal to generate a first control signal, wherein a rising slope of said first voltage signal is regulated in accordance with said error between said second type time interval and said reference time.

3. The control circuit of claim 2, wherein said second trigger circuit is configured to control said first control signal in order to change said length of said first time interval of said first switch.

4. The control circuit of claim 2, wherein said time regulator comprises:
   a) a single-trigger circuit configured to generate a single-trigger signal according to said first control signal, wherein a time duration during which said single-trigger circuit is active equals said reference time; and
   b) a first charge and discharge circuit comprising a first capacitor that is charged when said single-trigger signal is active, and is discharged when said switching signal is inactive, wherein a voltage across said first capacitor is configured as an adjustment signal to regulate said first control signal.

5. The control circuit of claim 2, wherein said second trigger circuit further comprises a second charge and discharge circuit comprising a second capacitor that is charged and discharged in order to generate said first voltage signal, wherein said reference voltage is directly proportional to said output voltage.

6. The control circuit of claim 1, wherein in said second state, said length of said first type time interval is increased correspondingly to decrease a switching frequency.

7. The control circuit of claim 1, wherein when said first type time interval is configured as an on time interval, said second type time interval is configured as an off time interval, and said reference time is not less than a minimum off time.

8. The control circuit of claim 7, further comprising a minimum off time circuit configured to maintain an off time interval of said first switch to be at least as long as a predetermined minimum off time, and wherein said reference time is not less than said minimum off time.

9. The control circuit of claim 1, wherein said reference time is not less than a minimum on time when said first type time interval is configured as off time interval and said second type time interval is configured as on time interval.

10. The switching regulator, comprising the control circuit of claim 1, and further comprising a power stage circuit having said first switch, wherein said control circuit generates said switching signal to control the turn on and off of said first switch.

11. The switching regulator of claim 10, wherein:
   a) said power stage circuit further comprises a second switch coupled in series with said first switch in series; and b) said switching signal is configured to control said second switch such that said first and second switches are alternately turned on and off.

12. A method of controlling a switching regulator having a first switch, the method comprising:
   a) generating an adjustment signal to regulate a length of a first type time interval in a switching period by comparing a second type time interval in said switching period against a reference time;
   b) in a first state, controlling a length of said first type time interval to be constant; and
   c) in a second state, regulating said length of said first type time interval correspondingly to improve a regulation range of an output signal of said switching regulator.

13. The method of claim 12, wherein said length of said first type time interval is increased correspondingly to decrease a switching frequency when in said second state.

14. The method of claim 12, wherein said length of said first type time interval is further increased more when said error between said length of said second type time interval and said reference time increases.

15. The method of claim 12, wherein said length of said first type time interval is regulated correspondingly when said length of said second type time interval is less than said reference time.

16. The method of claim 12, wherein a rising slope of a first voltage signal is correspondingly decreased in accordance with said error between said length of said second type time interval and said reference time.

17. The method of claim 12, wherein said reference time is not less than a minimum off time when said first type time interval is configured as an on time interval and said second type time interval is configured as off time interval.

18. The method of claim 12, wherein said reference time is not less than a minimum on time when said first type time interval is configured as an off time interval and said second type time interval is configured as on time interval.

19. The method of claim 18, further comprising:
   a) comparing said off time of said first switch against said reference time;
   b) controlling said on time of said first switch to be a constant on time when said off time of said first switch is greater than said reference time; and
   c) regulating said on time of said first switch according to an error between said off time and said reference time when said off time of said first switch is less than said reference time.

20. The method of claim 12, further comprising:
   a) generating a first trigger signal according to a ripple control mode;
   b) generating a first control signal according to an input voltage and an output voltage of said switching regulator;
   c) generating a second trigger signal according to said first control signal; and
   d) generating a switching signal according to said first trigger signal and said second trigger signal.

* * * * *